United States Patent
Germait et al.

(10) Patent No.: US 12,378,993 B2
(45) Date of Patent: Aug. 5, 2025

(54) BEARING WEAR MONITORING DEVICE FOR CIRCULAR CLARIFIER DRIVE

(71) Applicant: Evoqua Water Technologies LLC, Pittsburgh, PA (US)

(72) Inventors: Jeffrey P Germait, West Allis, WI (US); Allen Lepak, Mukwonago, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 190 days.

(21) Appl. No.: 18/271,062

(22) PCT Filed: Jan. 25, 2022

(86) PCT No.: PCT/US2022/013625
§ 371 (c)(1),
(2) Date: Jul. 6, 2023

(87) PCT Pub. No.: WO2022/159859
PCT Pub. Date: Jul. 28, 2022

(65) Prior Publication Data
US 2024/0102512 A1 Mar. 28, 2024

Related U.S. Application Data

(60) Provisional application No. 63/141,065, filed on Jan. 25, 2021.

(51) Int. Cl.
*F16C 19/16* (2006.01)
*B01D 21/20* (2006.01)
(Continued)

(52) U.S. Cl.
CPC ............ *F16C 19/522* (2013.01); *B01D 21/20* (2013.01); *F16C 19/16* (2013.01); *F16C 33/581* (2013.01);
(Continued)

(58) Field of Classification Search
CPC ...... F16C 19/16; F16C 19/166; F16C 19/522; F16C 2233/00; F16C 2240/46;
(Continued)

(56) References Cited

U.S. PATENT DOCUMENTS 3,847,032 A * 11/1974 Moser .................... B01D 21/20
74/427
5,194,155 A 3/1993 Schwartz
(Continued)

FOREIGN PATENT DOCUMENTS

| DE | 102018220110 A1 | 5/2020 |
| EP | 2801729 A2 | 11/2014 |
| WO | 2019120872 A1 | 6/2019 |

OTHER PUBLICATIONS

International Search Report, in corresponding PCT/US2022/013625, dated Apr. 6, 2022.

*Primary Examiner* — Phillip A Johnson

(57) ABSTRACT

A system for monitoring bearing wear in a circular clarifier drive is provided. The system includes a drive motor comprising at least one gear operatively coupled to at least a bridge platform, skimmer, and header of the circular clarifier drive. The at least one gear is rotatable within a housing of the circular clarifier drive on a plurality of bearings positioned therebetween. The system further includes at least one sensor constructed and arranged to measure a gap between at least one stop block of the housing and the at least one gear and determine if the measured gap is within a predetermined range. Methods of retrofitting a circular clarifier drive including a drive motor operatively coupled to at least one gear disposed within a housing and a plurality of bearings positioned between the at least one gear and the housing are also provided.

20 Claims, 4 Drawing Sheets

(51) Int. Cl.
  *F16C 19/52* (2006.01)
  *F16C 33/58* (2006.01)
  *G01M 13/04* (2019.01)
(52) U.S. Cl.
  CPC ......... *G01M 13/04* (2013.01); *F16C 2233/00* (2013.01); *F16C 2240/46* (2013.01); *F16C 2300/14* (2013.01); *F16C 2320/00* (2013.01); *F16C 2361/61* (2013.01)
(58) Field of Classification Search
  CPC . F16C 2300/14; F16C 2320/00; G01M 13/04; G01M 13/045; B01D 21/18; B01D 21/20
  See application file for complete search history.

(56) References Cited

U.S. PATENT DOCUMENTS

| | | |
|---|---|---|
| 5,306,422 A | 4/1994 | Krofta |
| 2013/0062268 A1 | 3/2013 | Kaneko et al. |
| 2015/0300479 A1 | 10/2015 | Frank |

\* cited by examiner

BEARING WEAR MONITORING DEVICE FOR CIRCULAR CLARIFIER DRIVE

CROSS-REFERENCE TO RELATED APPLICATIONS

This application claims priority under 35 U.S.C. § 119(e) to U.S. Provisional Patent Application Ser. No. 63/141,065 titled "Bearing Wear Monitoring Device for Circular Clarifier Drive" filed Jan. 25, 2021, the entire disclosure of which is hereby incorporated herein by reference in its entirety for all purposes.

FIELD OF TECHNOLOGY

Aspects and embodiments disclosed herein are generally related to the field of monitoring wear in actively driven mechanical systems.

SUMMARY

In accordance with one aspect, there is provided a system for monitoring bearing wear in a circular clarifier drive. The system may include a drive motor comprising at least one gear operatively coupled to at least a bridge platform, skimmer, and header of the circular clarifier drive. The at least one gear may be rotatable within a housing of the circular clarifier drive on a plurality of bearings positioned therebetween. The system further may include at least one sensor constructed and arranged to measure a gap between at least one stop block of the housing and the at least one gear and determine if the measured gap is within a predetermined range.

In some embodiments, the at least one sensor comprises an electrical sensor, an optical sensor, or a mechanical device. In particular embodiments, the at least one sensor comprises an optical sensor, e.g., a laser distance sensor or an ultrasonic sensor. In certain embodiments, the at least one sensor comprises an electrical sensor, e.g., an inductive proximity sensor. In further embodiments, the at least one sensor comprises a mechanical device, e.g., a deflection gauge or other similar mechanical measurement device.

In further embodiments, the system may include a display operatively coupled to the at least one sensor. The display may be a digital display, a mechanical display, or any other suitable type of display that can show the output of the at least one sensor.

In some embodiments, the at least one sensor is connected to the at least one stop block. For example, the at least one sensor may be attached to an exterior surface of the at least one stop block such that the gap between the at least one stop block and the at least one gear is in view the sensing element of the at least one sensor. In some embodiments, the at least one sensor is integrated within the at least one stop block. In particular embodiments, the at least one sensor may be positioned within a hollow recess within the at least one stop block with the sensing element of the at least one sensor in view of the gap between the at least one stop block and the at least one gear.

In some embodiments, the at least one sensor may be connected to one or more of a local area network (LAN), a wide area network (WAN), a BLUETOOTH® receiver, the internet, or a cloud-based data service. In such connections, the measurements collected by the at least one sensor may be sent to an output, e.g., an external location for controlling operation of the clarifier and/or the measurements collected by the at least one sensor may be collected and/or otherwise aggregated for future use, i.e., in a model for predicting maintenance schedules. In further embodiments, the at least one sensor may be constructed and arranged to provide an alert when the predetermined range for the gap between the at least one stop block and the at least one gear is exceeded.

In further embodiments, the system may include a sensor for measuring a torque applied to the at least one gear by the drive motor.

In further embodiments, the system may include a sensor for measuring a level of and/or a pressure of a lubricant for the at least one gear.

In further embodiments, the system may include a sensor for measuring vibrations of the at least one gear.

In some embodiments, each of the plurality of bearings are between 1 inch to 2 inches in diameter. In some embodiments, the gap between the at least one stop block and the at least one gear is between 0.05 inches and 0.30 inches.

In accordance with an aspect, there is provided a method of retrofitting a circular clarifier drive comprising a drive motor operatively coupled to at least one gear disposed within a housing and a plurality of bearings positioned between the at least one gear and the housing. The method may include positioning at least one sensor constructed and arranged to measure a predetermined gap between at least one stop block of the housing and the at least one gear. The method further may include electronically connecting the at least one sensor to a source of electrical power and an output device.

In further embodiments, the method may include monitoring the gap between the at least one stop block of the housing and the at least one gear within a predetermined range.

In some embodiments, connecting to the output device may include connecting the at least one sensor to one or more of a local area network (LAN), a wide area network (WAN), a BLUETOOTH® receiver, the internet, or a cloud-based data service. In other embodiments, connecting to the output device may include connecting the output device to one or more sensors constructed and arranged to measure vibrations of the at least one gear, a level or a pressure of a lubricant for the at least one gear, and torque applied to the at least one gear from the drive motor.

In further embodiments, the method may include determining a period of time for future maintenance on the circular clarifier drive based on trends in wear of the plurality of bearings or the plurality of bearing races. In certain embodiments, the trends in wear of the plurality of bearings or the plurality of bearing races may be based on historical data corresponding to the measured gap between the at least one stop block and the at least one gear. In other embodiments, the trends in wear of the plurality of bearings or the plurality of bearing races may be based on historical data corresponding to the measured gap between the at least one stop block and the at least one gear, the measured vibrations of the at least one gear, the measured level or pressure of a lubricant for the at least one gear, and the measured torque applied to the at least one gear from the drive motor.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
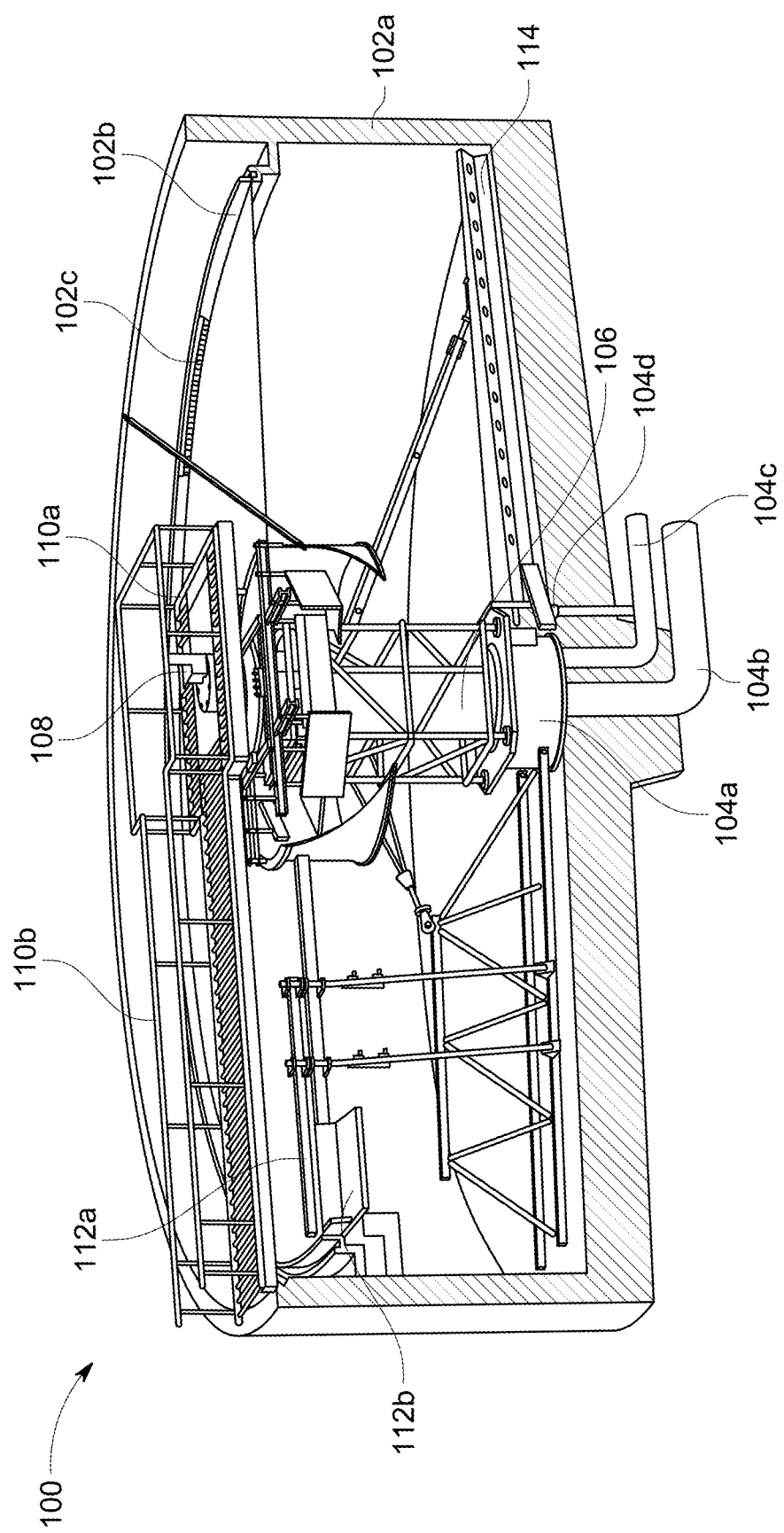
FIG. 1 illustrates a cross-sectional view of a circular clarifier, according to one embodiment.

Wastewaters obtained from various sources can contain bulk solid materials (e.g., sticks, rags, sand, and other materials that can be screened or filtered therefrom), smaller suspended solid materials that cannot be easily removed by screening or filtration, degradable organic compounds (sometimes designated biological oxygen demand or "BOD"), pathogenic microorganisms (e.g., bacteria, viruses, spores, cysts, and protists), and undesirable nutrients (e.g., nitrogen- or phosphorous-containing compounds that can encourage nuisance growth of algae or weeds at the wastewater discharge site). Discharge of these materials into the environment with the wastewater can have undesirable health and environmental consequences. As a result, wastewater discharges are closely regulated by state and national governments.

Many methods exist for removing undesirable components from wastewater prior to its discharge. Typically, a wastewater treatment method includes one or more treatment steps in which settleable and floatable solids materials are removed, one or more microbial (aerobic and/or anaerobic) degradation steps in which most suspended solids and BOD are removed or captured in biological solids or slimes produced in the degradation step, and one or more further treatment steps in which wastewater is clarified, disinfected, or further purified.

Clarifiers are devices that are used to remove suspended solids (including biological solids) from wastewater streams. An example of a circular clarifier is illustrated in cross-section in FIG. 1. In clarifier 100, broadly depicted as a large concrete vessel 102a having baffles 102b and effluent weirs 102c at its periphery, solids are allowed to settle from a wastewater stream by feeding wastewater using manifold 104a fed by influent line 104b to a central region of a large pool and maintaining wastewater substantially still in vessel 102a so that denser solids can separate by the action of gravity from less dense liquids and less dense solids. Often, the central region is physically segregated from the peripheral regions of the pool, although liquid can flow from the central region to the other regions of the pool. The physically segregated region is sometimes referred to as a stilling well, since the barrier that defines this chamber is intended to reduce transfer of kinetic energy from the wastewater flow entering the unit in order to reduce turbulence in peripheral areas of the pool (i.e., stilling the water in the pool). The chamber is in fluid communication with the peripheral areas of the pool (normally by way of a passage at the bottom of the stilling well) and permits gentle mixing between liquid in the pool and newly added wastewater. Solids that enter the clarifier 100 and accumulate on the floor are called sludge. Once the sludge has settled to the floor of the vessel 102a, header 114 is used to scrape the bottom of the vessel 102a and direct the sludge out of return sludge line 104c by using for example a vacuum. Floating solids on top of the wastewater in the vessel 102a are removed using skimmer 112a that collects the solids in scum trough 112b to direct it out of effluent weirs 102c and out of the vessel 102a. Clarified wastewater can be drained from vessel 102a using drain 106. With continued reference to FIG. 1, the clarifier drive platform 110a, bridge 110b, skimmer 112a, header 114 are rotated by using a drive mechanism 108 that comprises an electric motor and a plurality of bearing positioned against bearing races within a housing.

Figure 2:
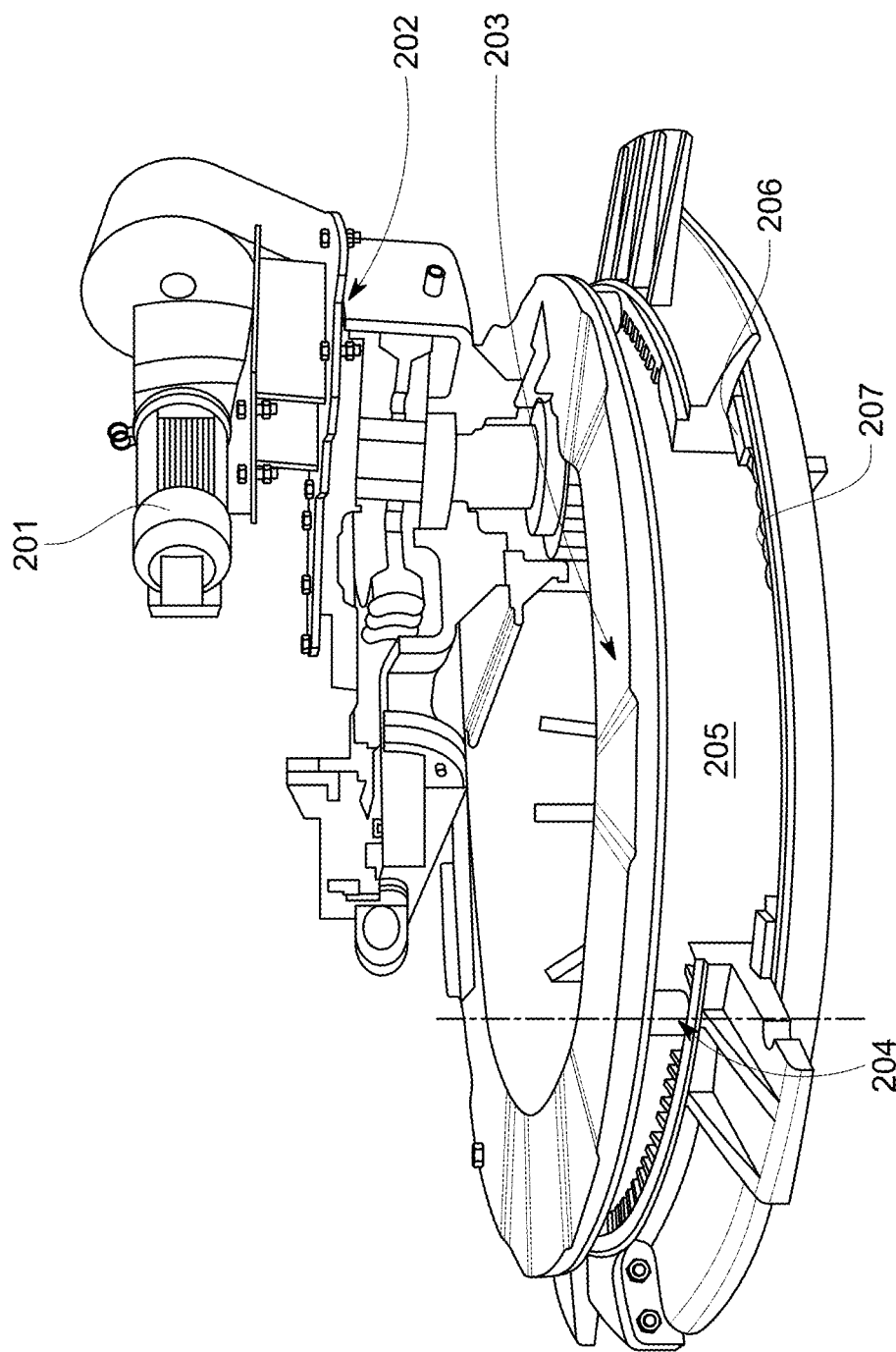
FIG. 2 illustrates a circular clarifier drive, according to one embodiment.

In accordance with one or more embodiments, there is provided a system for monitoring bearing wear in a circular clarifier drive. The system may include a drive motor comprising at least one gear operatively coupled to at least a bridge platform, skimmer, and header of the circular clarifier drive. The at least one gear may be rotatable within a housing of the circular clarifier drive on a plurality of bearings positioned therebetween. The plurality of bearings may rest on bearing races integrated into the housing. The system further may include at least one sensor constructed and arranged to measure a gap between at least one stop block of the housing and the at least one gear. The measurement of the gap further may include measuring the rate of change of the gap increase over a period of time. The at least one sensor further may be constructed and arranged to determine if the measured gap exceeds a predetermined range. FIG. 2 shows the clarifier drive platform illustrated in FIG. 1 with drive motor 201 and step down gears 202 positioned on top of the housing 203 with stop block 204 connected to the housing 203. Between the housing 203 and gear 205 are bearing races 206 and a plurality of bearings 207 that permits gear 205 to rotate. The dashed line in FIG. 2 corresponds to a vertical cross-section of the clarifier drive though the housing 203, stop block 204, and gear 205.

Figure 3A:
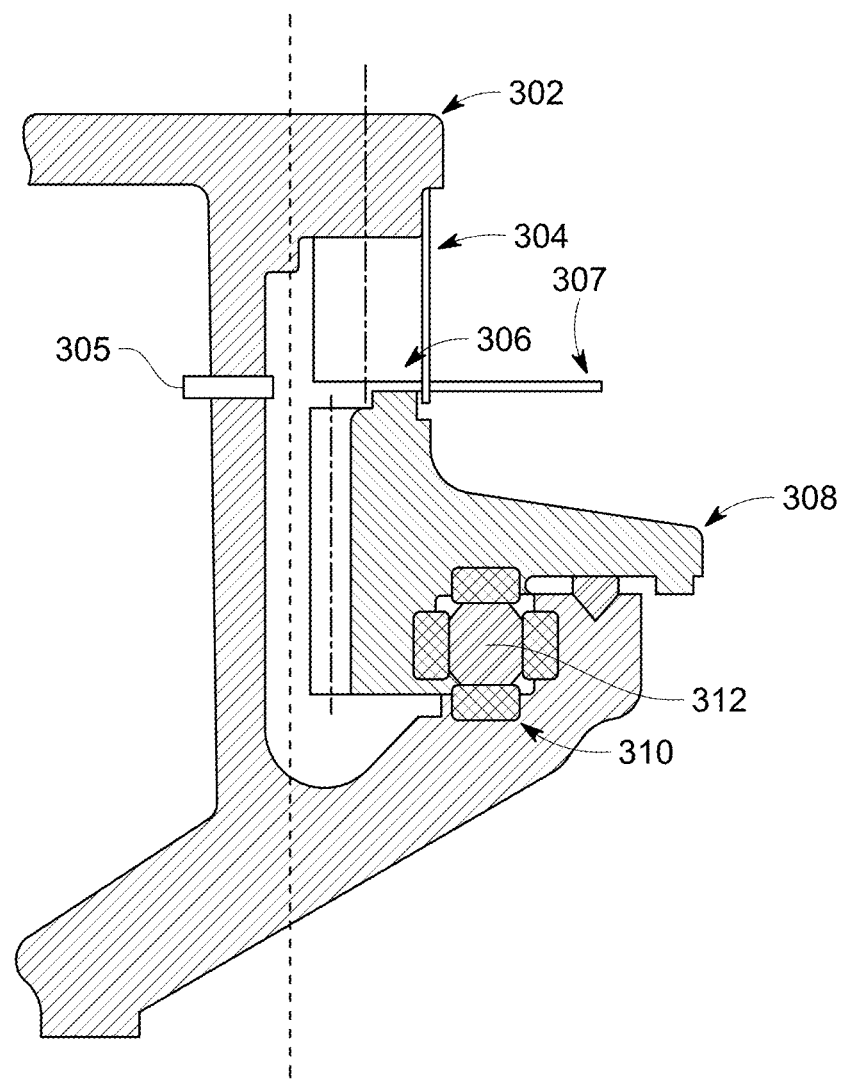
FIG. 3A illustrates a vertical cross-section of a portion of the circular clarifier drive of FIG. 2.
Figure 3B:
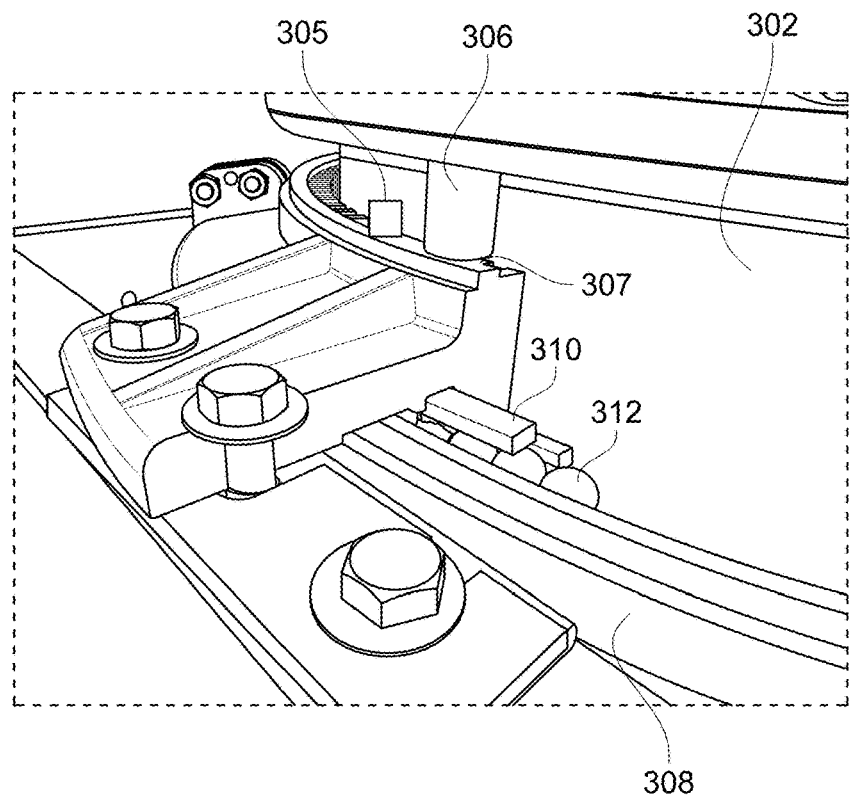
FIG. 3B is a view of a stop block positioned between the housing and gear of the circular clarifier drive of FIG. 2.
Figure 3C:
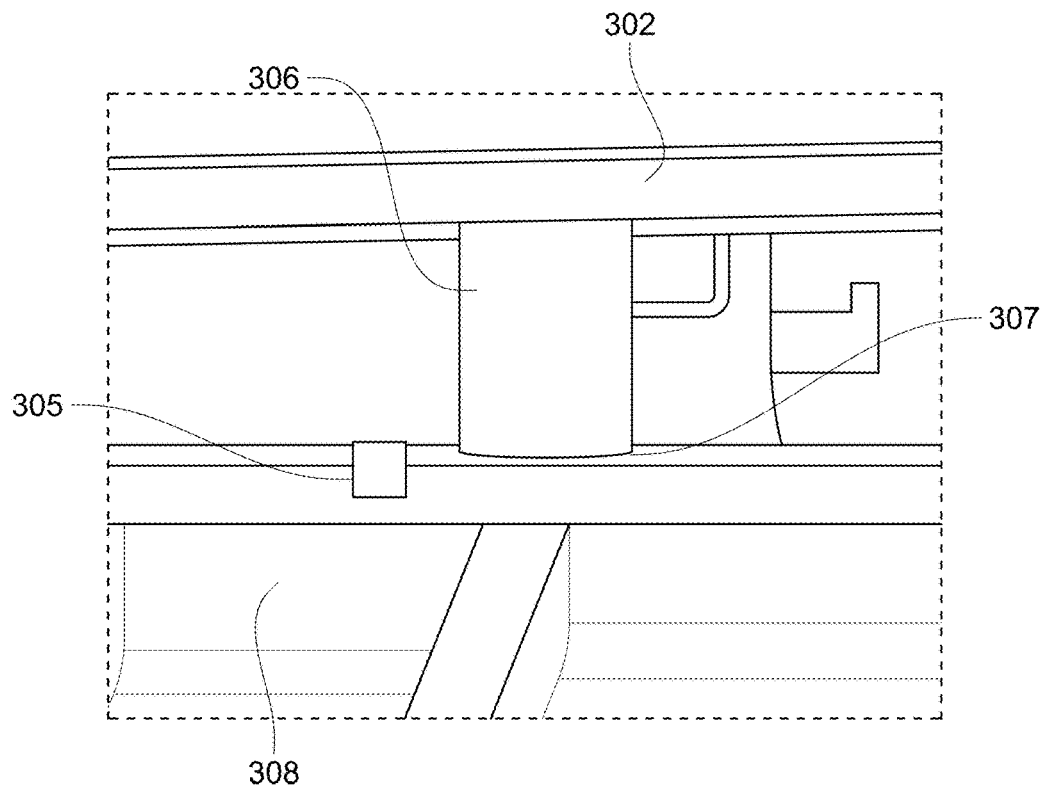
FIG. 3C illustrates an enlarged view of the stop block of FIG. 3B showing the stop block gap.

FIG. 3A illustrates a vertical cross-sectional view (as indicated by the dashed vertical line in FIG. 3A) of the circular clarifier drive corresponding to the dashed line in FIG. 2 with the position of the housing 302, dust cover 304, sensor 305, stop block 306, clarifier drive gear 308, bearing races 310, and bearings 312 illustrated. As assembled, the full weight of the clarifier drive, i.e., the drive motor and any components attached to the drive platform, skimmer, and header as illustrated in FIGS. 1 and 2, is pressed down onto the bearing races 310 and bearings 312. The weight will cause the bearing races 310 and bearings 312 to wear down over time as the clarifier drive rotates. In FIG. 3A, the gap 307 between the stop block 306 and the gear 308 is shown. As is shown, sensor 305 is positioned in such a manner as to be able to measure the gap 307 between the stop block 306 and the gear 308. FIG. 3B illustrates the positioning between the stop block 306, gear 308, bearing races 310 and bearings 312 with sensor 305 positioned adjacent to the stop block 306 and stop block gap 307. FIG. 3C is an enlarged view of the arrangement of FIG. 3B showing the gap between the stop block 306 and the gear 308. As the gear 308 rotates, one or both of the bearing races 310 and the plurality of bearings 312 positioned between the housing 302 and the gear 308 will wear as noted herein and it is important to monitor the bearing wear to prevent catastrophic failures that could render the clarifier inoperable. Prior to this disclosure, operators in a wastewater treatment plant would remove the dust shield 304 and measure the gap 307 between the stop block 306 and the gear 308 of the clarifier drive manually using one or more measurement gauges, such as a feeler gauge. The measured gap 307 between the stop block 306 and the gear 308 of the clarifier drive is then compared to a reference chart or table including acceptable values for the gap 307 to determine when maintenance is required. Given the confined space of the stop block 306 location and the inherent dangers of operating in and around the drive motor, the stop block gap 307 measurement often goes un-checked. If the bearing wear exceeds a predetermined range, catastrophic failure and/or housing damage can occur making the drive mechanism inoperable and require full replacement. It is an object of the present disclosure to provide systems for monitoring the wear of bearings in the gears of circular clarifier drive mechanisms and to retrofit existing circular clarifier drive mechanisms to monitor bearing wear.

The at least one sensor of the system may include any practicable sensor that can measure the stop block gap, such as an electrical sensor, an optical sensor, or a mechanical device. For example, electrical and optical sensors suitable for measuring the stop block gap may include, but are not limited to, ultrasonic sensors, proximity, e.g., inductive proximity, sensors, photoelectric, e.g., laser, infrared, or visible light, sensors, and other similar sensors. In particular embodiments, the electrical sensor may be an inductive proximity sensor. In other embodiments, the optical sensor may be a laser distance sensor. Alternatively or in addition, the at least one sensor may be a mechanical device, such as a deflection gauge or another similar mechanical device than can measure the gap between two objects. The at least one sensor includes appropriate connections for powering the sensor's active element and internal storage/data transmission circuitry. For example, the at least one sensor may be constructed and arranged to be connected to a type of wired power supply unit, such as transformer or rectifier of appropriate voltage or connected to a common power line, e.g., 110/120/210/240 V. Alternatively, the at least one sensor may include a battery, e.g., rechargeable or replaceable battery, to provide the necessary electrical power. In this configuration, the at least one sensor further may be configured to provide an alert to a technician or operator of a low battery that would need to be replaced to maintain operation of the at least one sensor.

The at least one sensor may be positioned in any suitable location on one or more parts of the clarifier drive. For example, the at least one sensor may be connected to the at least one stop block itself. In this configuration, the at least one sensor may be connected to the outside of the stop block using a suitable fastener, e.g., clip, clamp, screw, or similar, such that the active element of the at least one sensor is positioned to measure the stop block gap. In some cases, the at least one sensor may be integrated into, i.e., within, the at least one stop block. The stop block may include a hollow recess within dimensioned to accommodate the at least one sensor such that the active element of the at least one sensor is positioned to measure the stop block gap. In some implementations, the at least one sensor may replace at least one different stop block on the housing. Alternatively, or in addition, at least one sensor may be connected to or otherwise associated with the housing, i.e., using a suitable fastener, such that that the active element of the at least one sensor is positioned to measure the stop block gap.

The output of the at least one sensor can be displayed to an end user, i.e., a plant operator or technician, using any suitable type of display capable of showing a numerical output. For example, a display may be a type of screen, e.g., a LCD or LED screen, that shows the gap in the proper unit of measure. The display can be posited at any practical location at the clarifier, such as an accessible platform on the clarifier or a control booth/tower that would permit reading of the display without risk of personal injury to the end user.

As described herein, the system may include one or more additional sensors constructed and arranged to measure additional properties of the system. For example, there may be sensors for gear vibrations, fluid levels, e.g., lubricant levels, fluid pressures, and motor torque. The one or more additional sensors may be constructed and arranged to have their output connected to the display device that displays the output of the at least one sensor used to display the stop block gap measurement. Alternatively, the one or more additional sensors may sensors may be constructed and arranged to have their output connected to a different display device or otherwise displayed independently from the data from the at least one sensor for the stop block gap.

The at least one sensor may be constructed and arranged to measure the gap between the at least one stop block and at least one gear and transmit the measured gap to one or more locations, such as a spreadsheet, database, or user device. In some cases, the at least one sensor may include a type of storage medium, such as ROM, RAM, or flash memory, that can store the measured data for retrieval or access at a future point in time. The transmission of the measured gap data may occur via a wired transmission protocol, such as broadband internet connection, e.g., a Local Area Network (LAN) or a Wide Area Network (WAN) to a centralized data collection point inside of a principal processing facility or to a user device or other type of centralized location. In some cases, the at least one sensor further may include appropriate wired connections for data transmission under any suitable standard, e.g., RS-232 or Universal Serial Bus (USB). Alternatively, or in addition, the data representative of the measured gap may be gathered wirelessly, for example, by means of the GSM cellular telephone network using a modem connected to a computer or a hand-held device, by Wi-Fi, BLUETOOTH®, or other wireless data collection methods known in the art, e.g., based on the LTE Cat 1, LTE Cat M1 or Cat NB1 standard. In such implementations, the clarifier itself and/or the treatment plant housing the clarifier includes the necessary hardware to facilitate wireless transmission, such as a cellular modem, access point, or gateway. The collection and transmission of the measured gap data may occur directly or indirectly. The at least one sensor may be configured to collect data of the measured gap according to a predetermined schedule. For example, the at least one sensor may be configured to collect data at intervals of minutes, such as every 1 minute, 2 minutes, 3 minutes, 4 minutes, 5 minutes, 6 minutes, 7 minutes, 8 minutes, 9 minutes, 10 minutes, 20 minutes, 30 minutes, 40 minutes, 50 minutes, or 60 minutes. In some implementations, the at least one sensor may be configured to collect data at intervals of hours, such as every 1 hour, 2 hours, 3 hours, 4 hours, 5 hours, 6 hours, 7 hours, 8 hours, 9 hours, 10 hours, 12 hours, 18 hours, or 24 hours. In further implementations, the at least one sensor may be configured to collect data at intervals of days or weeks, such as every day, 2 days, 3 days, 4 days, 5 days, 6 days, 7 days, 10 days, 2 weeks, 3 weeks, 4 weeks (e.g., monthly), 5 weeks, 6 weeks, 7 weeks, or 8 weeks (e.g., every two months). One of skill in the art can determine the needed frequency of data collection from the at least one sensor based on experience and expected lifetimes of the plurality of bearings or bearing races.

The at least one sensor may be configured to transmit the collected data representative of the stop block gap according to a predetermined schedule. For example, the collected data may be transmitted from the at least one sensor at intervals of hours, such as every 1 hour, 2 hours, 3 hours, 4 hours, 5 hours, 6 hours, 7 hours, 8 hours, 9 hours, 10 hours, 12 hours, 18 hours, or 24 hours. In some implementations, the collected data may be transmitted from the monitoring station at intervals of days, such as 1 day, every 2 days, every 3 days, every 4 days, every 5 days, every 6 days, or every 7 days, that is, weekly. The predetermined schedule may be varied by an operator as needed. In other embodiments, the at least one sensor may be configured to collect and analyze or transmit the data continuously in real time.

In some embodiments, the at least one sensor may be constructed and arranged to provide an alert when the predetermined range of the stop block gap is exceeded. The at least one sensor may be configured to provide for a visual and/or audible alert that the predetermined range of the stop block gap has been exceeded. For example, at least one sensor may be configured to activate a light, such as a strobe light or other visual indicator at the clarifier or treatment plant, when the predetermined range of the stop block gap has been exceeded. In other cases, the at least one sensor may be configured to emit an audible tone, such as a bell sound or the like, when the predetermined range of the stop block gap has been exceeded. Alternatively, or in addition, the alert provided by the at least one sensor may be provided to a location remote from the at least one sensor. For example, the alert provided by the at least one sensor may be delivered to a control panel or terminal of the clarifier, or to a mobile device that an operator or technician has access to. One of skill in the art would be able to determine the proper setup for alerts generated from the at least one sensor such that the alert would be recognized and acted on appropriately by an operator or technician.

The maintenance schedule of a clarifier or one or more component thereof, i.e., the clarifier drive, may be determined by one or more additional factors in combination with the measured stop block gap as described herein. As is known, clarifiers (and other wastewater treatment system components) generally include a variety of sensors used to monitor various stages of the wastewater treatment process and the equipment performing these processes to allow operators or technicians to monitor said processes. As it pertains to clarifier drives as disclosed herein, the system may include one or more sensors that monitor a property of the clarifier drive. For example, the system may include a sensor for monitoring the torque applied to the at least one gear by the drive motor of the clarifier drive. An increase in the torque applied to the at least one gear may be an indication of excessive bearing or bearing race wear or a lack of adequate lubrication to the bearings, making the at least one gear more difficult to turn. In some cases, the system further may include a sensor for measuring a level or pressure of a lubricant for the at least one gear. As is known, bearings generally require lubrication in order to rotate when positioned in bearing races to reduce friction. When the level or pressure of lubricant is below a threshold amount or, as in the case of lubricants that can potentially contact water, causing separation of the lubricant, the bearings may be difficult to rotate and can wear excessively with increased metal-to-metal contact between the bearings and bearing races. Should the level or pressure of lubricant become too low by being replaced with water from operation of the clarifier, e.g., inadvertent mixing of wastewater and lubricant, a technician or operator may be able to reduce the level of water in the lubricant chamber by opening a drain valve to release the collected water with a subsequent refill or replacement of the lubricant. In some implementations, the system further may include a sensor for measuring vibrations of the at least one gear. As the at least one gear rotates within the housing, the at least one gear will vibrate due to the operation of the drive motor. The vibrations of the gear can be controlled, at least in part, by the closeness of the fit between the plurality of bearings and their positioning in the bearing races of the housing. As the plurality of bearings begin to wear, their fit within the bearing races becomes looser, thus resulting in larger amplitude vibrations of the at least one gear during operation of the clarifier drive. In any of these additional sensors, each may be configured in a manner similar to the at least one sensor for measuring the stop block gap, i.e., have a display, may be configured to measure and transmit data at the same or similar frequency, and/or provide an alert at the installed location or to a remote location to an operator or technician. In some cases, one or more of these additional sensor measurements may be used to determine if maintenance is needed on the circular clarifier drive instead of the stop block gap measurement.

In some embodiments, the gap between the stop block and the at least one gear may be between about 0.05 inches and about 0.30 inches, e.g., the stop block gap is about 0.05 inches, about 0.06 inches, about 0.07 inches, about 0.08 inches, about 0.09 inches, about 0.10 inches, about 0.11 inches, about 0.12 inches, about 0.13 inches, about 0.14 inches, about 0.15 inches, about 0.16 inches, about 0.17 inches, about 0.18 inches, about 0.19 inches, about 0.20 inches, about 0.21 inches, about 0.22 inches, about 0.23 inches, about 0.24 inches, about 0.25 inches, about 0.26 inches, about 0.27 inches, about 0.28 inches, about 0.29 inches, or about 0.30 inches.

In some embodiments, each of the plurality of bearings may have a diameter between about 1 inch to about 2 inches, e.g., about 1 inch, about 1.1 inches, about 1.2 inches, about 1.3 inches, about 1.4 inches, about 1.5 inches, about 1.6 inches, about 1.7 inches, about 1.8 inches, about 1.9 inches, or about 2 inches. The diameter of the plurality of bearings may be determined by the size of one or more of the at least one gear, drive motor, or another driven clarifier component, such as a header or skimmer. Without wishing to be bound by any particular theory, larger and/or heavier components to be driven will require larger bearings with greater surface area to reduce the rotational force necessary to rotate said components. One of skill in the art would readily be able to determine the appropriate bearing size for the size and weight of the components to be rotated by the clarifier drive motor.

In accordance with an aspect, there is provided a method of retrofitting a circular clarifier drive including a drive motor operatively to at least one gear disposed within a housing and a plurality of bearings positioned between the at least one gear and the housing. The method may include positioning at least one sensor constructed and arranged to measure a predetermined gap between at least one stop block of the housing and the at least one gear. The method further may include electronically connecting the at least one sensor to a source of electrical power and an output device. For example, the at least one sensor may be connected to line voltage, a low voltage transformer, or a type of battery.

In some embodiments, the method of retrofitting further may include monitoring the gap between the at least one stop block of the housing and the at least one gear within a predetermined range.

In some embodiments, the method of retrofitting may include connecting to the output device may include connecting the at least one sensor to one or more of a local area network (LAN), a wide area network (WAN), a BLUETOOTH® receiver, the internet, or a cloud-based data service as described herein. In further embodiments, connecting to the output device may include connecting the output device one or more sensors constructed and arranged to measure vibrations of the at least one gear, a level or a pressure of a lubricant for the at least one gear, and torque applied to the at least one gear from the drive motor.

In any system or method described herein, the use of one or more measured variables, e.g., stop block gap, as described herein may allow for the prediction of the next maintenance cycle for the clarifier drive, e.g., bearing or bearing race replacement. The period of time for maintenance may be predicted based on trends in wear of the plurality of bearings or the plurality of bearing races, such as by the stop block gap measurement. For example, the at least one sensor for measuring the stop block gap, stand-alone or in combination with one or more additional sensors as described herein, may continuously monitor the bearing race or bearing wear and determine when the bearing races or bearings need to be replaced before a failure point is reached. A prediction of bearing race wear or bearing wear may also be based on historical collected data for one or more variables as described herein, i.e., based on historical data corresponding to one or more of the measured gap between the at least one stop block and the at least one gear, the measured vibrations of the at least one gear, the measured level or pressure of a lubricant for the at least one gear, and the measured torque applied to the at least one gear from the drive motor. This data may be used to select a time period where the bearings can be replaced without causing significant disruption of the clarifier or wastewater treatment plant operations.

PROPHETIC EXAMPLE

The function and advantages of these and other embodiments can be better understood from the following prophetic example. This prophetic example is intended to be illustrative in nature and is not considered to be in any way limiting the scope of the invention.

Prophetic Example 1— Bearing Replacement Parameters

As described herein, the plurality of bearings and/or the bearing races of the at least one gear of the clarifier drive are to be replaced when the gap between the stop block of the clarifier drive housing and the at least one gear exceeds a predetermined range. The minimum and maximum stop block gaps are a function of the size, i.e., the diameter, of the ball bearing races and the plurality of bearings, and as described herein, the size of the bearings is a function of the size of other driven components. Table 1 provides the sizes of ball bearing races, bearings, and stop block gaps for various clarifier drives. In operation, at least one sensor will be positioned in such a way as to measure the stop block gap between the at least one gear and the housing of the clarifier drive, and this data is to be sent to a technician or operator for review, e.g., on a display or output device such as tablet or control terminal in a plant. The at least one sensor will also be constructed and arranged to measure the rate at which the bearings (or bearing races) wear down during use of the clarifier, i.e., the rate at which the stop block gap increases, and this data is to be sent to a technician or operator for review, e.g., on a display or output device such as tablet or control terminal in a plant.

TABLE 1

Sizes of Clarifier Ball Races, Bearings, and Stop Gaps.

| Nominal Ball Race Dia. (in.) | Bearing Diameter (in.) | Min. Stop Block Gap (in) | Max. Stop Block Gap (in.) | Gear-Housing Clearance (in.) |
|---|---|---|---|---|
| 30 | 1 | 0.07 | 0.225 | 0.25 |
| 40 | 1 | 0.07 | 0.225 | 0.25 |
| 60 | 1.25 | 0.093 | 0.225 | 0.25 |
| 80 | 1.50 | 0.093 | 0.225 | 0.25 |
| 85 | 1.50 | 0.093 | 0.225 | 0.25 |
| 90 | 1.50 | 0.093 | 0.225 | 0.25 |

For the different ball bearing race sizes, the measured stop block gaps are to be used as setpoints for triggering the at least one sensor to transmit an alert to a technician or operator that maintenance of the clarifier drive may be needed. When the stop block gap approaches 0.2 inches, the bearing races, of which there are four in a typical clarifier drive such as illustrated in FIG. 3A, are to be replaced. Using sensors having high precision may allow for the listed setpoints in Table 1 to be adjusted in order to extend the operational time of the clarifier drive.

If the measured stop block gap reaches the maximum value listed in Table 1, the clarifier drive is to be rebuilt, which includes replacement of all bearings and bearing races. Under normal maintenance practices using manual measurements of the top side of the gear and the lower surface of the stop block are generally inspected for wear, such as worn out or scored surfaces. If either surface shows wear, the clarifier drive should be inspected before continued operation of the clarifier.

Using the tabulated values of Table 1 as endpoints and the general recommended maintenance schedule described herein, the measured stop block gap using at least one sensor can be used to predict the period of time when the appropriate maintenance is to be performed. The measured stop block gap data, i.e., the stop block gap and the rate of change of the stop block gap increase, is to be further supplemented with measured data from other sensors of the clarifier drive, including sensors for gear vibrations, lubricant level and pressure, and drive motor torque. These additional sensors can provide a more complete picture of the operational status of the system and can be used to determine is needed and/or if the maintenance is to be performed on a component other than the bearings or bearing races of the clarifier drive.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only. Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A system for monitoring bearing wear in a circular clarifier drive, comprising:
    a drive motor comprising at least one gear operatively coupled to at least a bridge platform, skimmer, and header of the circular clarifier drive, the at least one gear rotatable within a housing of the circular clarifier drive on a plurality of bearings positioned therebetween; and
    at least one sensor constructed and arranged to measure a gap between at least one stop block of the housing and the at least one gear and determine if the measured gap is within a predetermined range.

2. The system of claim 1, wherein the at least one sensor comprises an electrical sensor, an optical sensor, or a mechanical device.

3. The system of claim 2, wherein the at least one sensor comprises an optical sensor.

4. The system of claim 3, wherein the optical sensor comprises a laser distance sensor.

5. The system of claim 2, wherein the at least one sensor comprises an electrical sensor.

6. The system of claim 5, wherein the electrical sensor comprises an inductive proximity sensor.

7. The system of claim 2, wherein the at least one sensor comprises a mechanical device.

8. The system of claim 1, further comprising a display operatively coupled to the at least one sensor.

9. The system of claim 1, wherein the at least one sensor is connected to the at least one stop block.

10. The system of claim 1, wherein the at least one sensor is connected to the housing.

11. The system of claim 1, wherein the at least one sensor is further constructed and arranged to provide an alert when the predetermined range is exceeded.

12. The system of claim 1, further comprising a sensor for measuring torque applied to the at least one gear.

13. The system of claim 12, further comprising a sensor for measuring a level of a lubricant for the at least one gear.

14. The system of claim 13, further comprising a sensor for measuring vibrations of the at least one gear.

15. A method of retrofitting a circular clarifier drive comprising a drive motor operatively coupled to at least one gear disposed within a housing and a plurality of bearings positioned between the at least one gear and the housing, the method comprising:
    positioning at least one sensor constructed and arranged to measure a predetermined gap between at least one stop block of the housing and the at least one gear; and
    electronically connecting the at least one sensor to a source of electrical power and an output device.

16. The method of claim 15, further comprising monitoring the gap between the at least one stop block of the housing and the at least one gear within a predetermined range.

17. The method of claim 15, wherein connecting to the output device comprises connecting the output device to one or more sensors constructed and arranged to measure vibrations of the at least one gear, a level or a pressure of a lubricant for the at least one gear, and torque applied to the at least one gear from the drive motor.

18. The method of claim 17, wherein the trends in wear of the plurality of bearings or the plurality of bearing races is based on historical data corresponding to the measured gap between the at least one stop block and the at least one gear, the measured vibrations of the at least one gear, the measured level or pressure of the lubricant for the at least one gear, and the measured torque applied to the at least one gear from the drive motor.

19. The method of claim 15, further comprising determining a period of time for future maintenance on the circular clarifier drive based on trends in wear of the plurality of bearings or the plurality of bearing races.

20. The method of claim 19, wherein the trends in wear of the plurality of bearings or the plurality of bearing races is based on historical data corresponding to the measured gap between the at least one stop block and the at least one gear.

* * * * *